United States Patent
Fujii

(10) Patent No.: US 8,736,859 B2
(45) Date of Patent: May 27, 2014

(54) IMAGE FORMING SYSTEM AND PRINTER CONTROLLER

(75) Inventor: Takayuki Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 13/368,017

(22) Filed: Feb. 7, 2012

(65) Prior Publication Data

US 2012/0206764 A1 Aug. 16, 2012

(30) Foreign Application Priority Data

Feb. 10, 2011 (JP) ................................ 2011-027538

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC *G06F 3/12* (2013.01); *G06K 15/40* (2013.01); *G06K 15/4025* (2013.01); *G06F 3/1281* (2013.01)
USPC .......................................... 358/1.13; 358/1.1

(58) Field of Classification Search
CPC ..... G06F 3/1281; G06F 3/1215; G06K 15/40; G06K 15/4025
USPC ................ 358/1.1, 1.13, 1.15, 1.18
See application file for complete search history.

(56) References Cited

U.S. PATENT DOCUMENTS

| | | | |
|---|---|---|---|
| 7,024,152 B2 | 4/2006 | Lofthus et al. | |
| 7,336,920 B2 | 2/2008 | Anderson | |
| 2004/0056409 A1* | 3/2004 | Kawata | 271/9.01 |
| 2005/0207811 A1* | 9/2005 | Kimura et al. | 399/401 |
| 2006/0067756 A1* | 3/2006 | Anderson et al. | 399/341 |

FOREIGN PATENT DOCUMENTS

JP 6-161185 A 6/1994

\* cited by examiner

*Primary Examiner* — Douglas Tran
(74) *Attorney, Agent, or Firm* — Canon U.S.A., Inc., IP Division

(57) ABSTRACT

An image forming system includes a first image forming apparatus, a second image forming apparatus disposed upstream in a sheet conveying direction and connected to the first image forming apparatus, and a post-processing apparatus that receives a sheet at a speed depending on a conveyance speed of a sheet discharged from the first image forming apparatus and that performs post-processing on the sheet. When a print job including a simplex image forming mode and a duplex image forming mode is to be executed, in the simplex image forming mode, a sheet is discharged in a reversed state to the post-processing apparatus. In the duplex image forming mode, the second image forming apparatus forms an image on a back side of a sheet, the first image forming apparatus forms an image on a front side of the sheet, and the sheet is discharged in a reversed state to the post-processing apparatus.

4 Claims, 10 Drawing Sheets

FIG. 7

| OUTPUT MODE | | IMAGE FORMING APPARATUS 10 | IMAGE FORMING APPARATUS 500 | |
|---|---|---|---|---|
| | | IMAGE FORMING SURFACE (OF DISCHARGED SHEET) | IMAGE FORMING SURFACE (OF DISCHARGED SHEET) | |
| SIMPLEX PRINTING MODE | | FRONT SIDE (REVERSE DISCHARGE) | | PT1 |
| DUPLEX PRINTING MODE | | BACK SIDE (STRAIGHT DISCHARGE) | FRONT SIDE (REVERSE DISCHARGE) | PT2 |
| SIMPLEX/DUPLEX PRINTING MODE | SIMPLEX PRINTING | FRONT SIDE (REVERSE DISCHARGE) | BACK SIDE (REVERSE DISCHARGE) | PT3 |
| | DUPLEX PRINTING | FRONT SIDE (REVERSE DISCHARGE) | | PT4 |

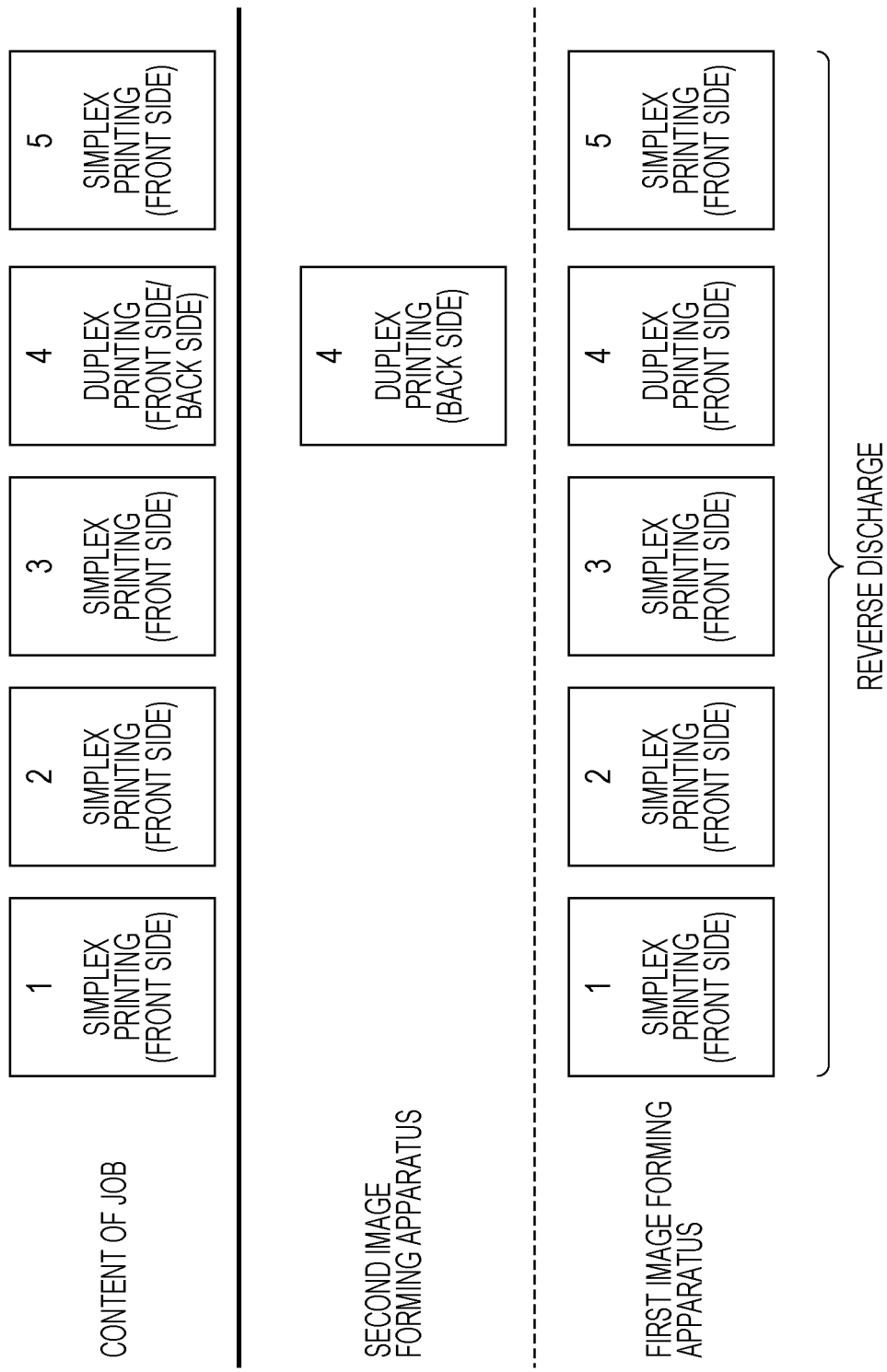

IMAGE FORMING SYSTEM AND PRINTER CONTROLLER

BACKGROUND OF THE INVENTION

1. Field of the Invention

The present invention relates to an image forming system in which a plurality of printers are connected to one another in a sheet conveying direction.

2. Description of the Related Art

Generally, when a digital multifunction device is used as a printer, data is sent, starting from the first page, and, for example, pages of a five-page document are printed in the order of the first, second, third, fourth, and fifth pages. In order to output printed pages in correct order on a paper output tray, sheets are discharged with their image forming surfaces facing down. Therefore, an image forming apparatus has a sheet reversing mechanism for reversing or turning over a sheet.

Examples of the sheet reversing mechanism include a sheet reversing mechanism of a switch-back type in which, after a sheet is pulled back into a reverse conveying path that branches from a straight discharge conveying path, the conveying direction of the sheet is changed and the sheet is delivered in the changed conveying direction. In this case, a sheet interval corresponding to at least the distance required for switchback is needed to ensure that no collision of successively conveyed sheets occurs in the reverse conveying path. Accordingly, control is performed so that the speed at which sheets are conveyed from a fixing device and discharged from the main body of the image forming apparatus through the reverse conveying path is higher than that for straight discharge in order to increase productivity without increasing the sheet interval. This control allows the discharge interval for reverse discharge to be made equal to the discharge interval for straight discharge (see, for example, Japanese Patent Laid-Open No. 6-161185).

When the discharge speed is changed, a sheet post-processing apparatus that receives a discharged sheet also needs to change the conveyance speed in accordance with the discharge speed from the main body of the image forming apparatus.

For example, if the discharge speed from the image forming apparatus is higher than the speed at which the sheet post-processing apparatus receives a discharged sheet, sheets may be jammed between the sheet post-processing apparatus and the image forming apparatus, thus suppressing normal conveyance. It is therefore desirable that the sheet post-processing apparatus and the main body of the image forming apparatus be controlled so that the conveyance speed provided by the sheet post-processing apparatus and the discharge speed from the main body of the image forming apparatus are substantially equal.

A tandem image forming system is also known in which two printers are connected to each other to achieve high-efficiency two-sided (or duplex) image formation (see U.S. Pat. No. 7,024,152). The tandem image forming system provides duplex copying by forming an image on one side of a sheet using a first printer, reversing the sheet, and then forming an image on the other side of the sheet using a second printer. The time required for the above configuration is shorter than the time required for duplex copying with a single printer.

If the conveyance speed of a sheet received by the post-processing apparatus from the image forming apparatus is different from the conveyance speed of the preceding sheet, the post-processing apparatus also needs to change the conveyance speed. The post-processing apparatus changes the conveyance speed of a sheet after no sheets remain in the conveying path in the post-processing apparatus or after the preceding sheet has passes through rollers driven by the same motor in a receiving unit in the post-processing apparatus. That is, it takes time for the post-processing apparatus to be allowed to change the conveyance speed. Therefore, a large sheet interval is provided before and after the sheet conveyance speed is changed, resulting in a reduction in productivity.

In a tandem image forming apparatus, there is no need to change the conveyance speed if printing is performed only in a duplex image forming mode. However, printing may also be performed in a one-sided (or simplex) image formation mode and a duplex image forming mode. When both a simplex image forming mode and a duplex image forming mode are used, the post-processing apparatus needs to change the conveyance speed. In this case, the benefits of increasing productivity due to duplex image formation being performed using a tandem image forming system are not sufficiently taken advantage of.

SUMMARY OF THE INVENTION

Accordingly, the present invention provides an image forming apparatus and a print controller that do not reduce productivity in a tandem image forming system when performing printing in both a simplex image forming mode and a duplex image forming mode.

A first aspect of the present invention provides an image forming system including a first image forming apparatus, a second image forming apparatus disposed upstream of the first image forming apparatus in a sheet conveying direction and connected to the first image forming apparatus, and a post-processing apparatus that receives a sheet at a speed which is changed in accordance with a conveyance speed of a sheet discharged from the first image forming apparatus and that performs post-processing on the sheet. The image forming system includes an image forming controller configured to control the first image forming apparatus and the second image forming apparatus to perform a simplex image forming mode and a duplex image forming mode, the simplex image forming mode being a mode in which an image is formed on one side of a sheet and in which the sheet is discharged to the post-processing apparatus, the duplex image forming mode being a mode in which images are formed on both sides of a sheet and in which the sheet is discharged to the post-processing apparatus; a reversing unit configured to reverse a sheet so that the sheet is discharged to the post-processing apparatus in such a manner that a side of the sheet on which an image is formed faces down; and a speed controller configured to control a sheet conveyance speed so that a conveyance speed at which a sheet reversed by the reversing unit is discharged to the post-processing apparatus is higher than a conveyance speed at which a sheet is discharged to the post-processing apparatus without being reversed by the reversing unit. When a print job that includes both the simplex image forming mode and the duplex image forming mode is to be executed, in the simplex image forming mode, the image forming controller causes the reversing unit to reverse a sheet and discharge the reversed sheet to the post-processing apparatus, and, in the duplex image forming mode, the image forming controller causes the second image forming apparatus to form an image on a back side of a sheet, causes the first image forming apparatus to form an image on a front side of the sheet, and causes the reversing unit to reverse the sheet and discharge the reversed sheet to the post-processing apparatus.

Further features of the present invention will become apparent from the following description of exemplary embodiments with reference to the attached drawings.

BRIEF DESCRIPTION OF THE DRAWINGS

FIG. 7 is a diagram illustrating the relationship between each of a simplex image forming mode, a duplex image forming mode, and a combined simplex-duplex image forming mode and the discharge operation of each image forming apparatus.

FIG. 10 is a diagram illustrating an example of a combined simplex-duplex print job.

DESCRIPTION OF THE EMBODIMENTS

Figure 1:
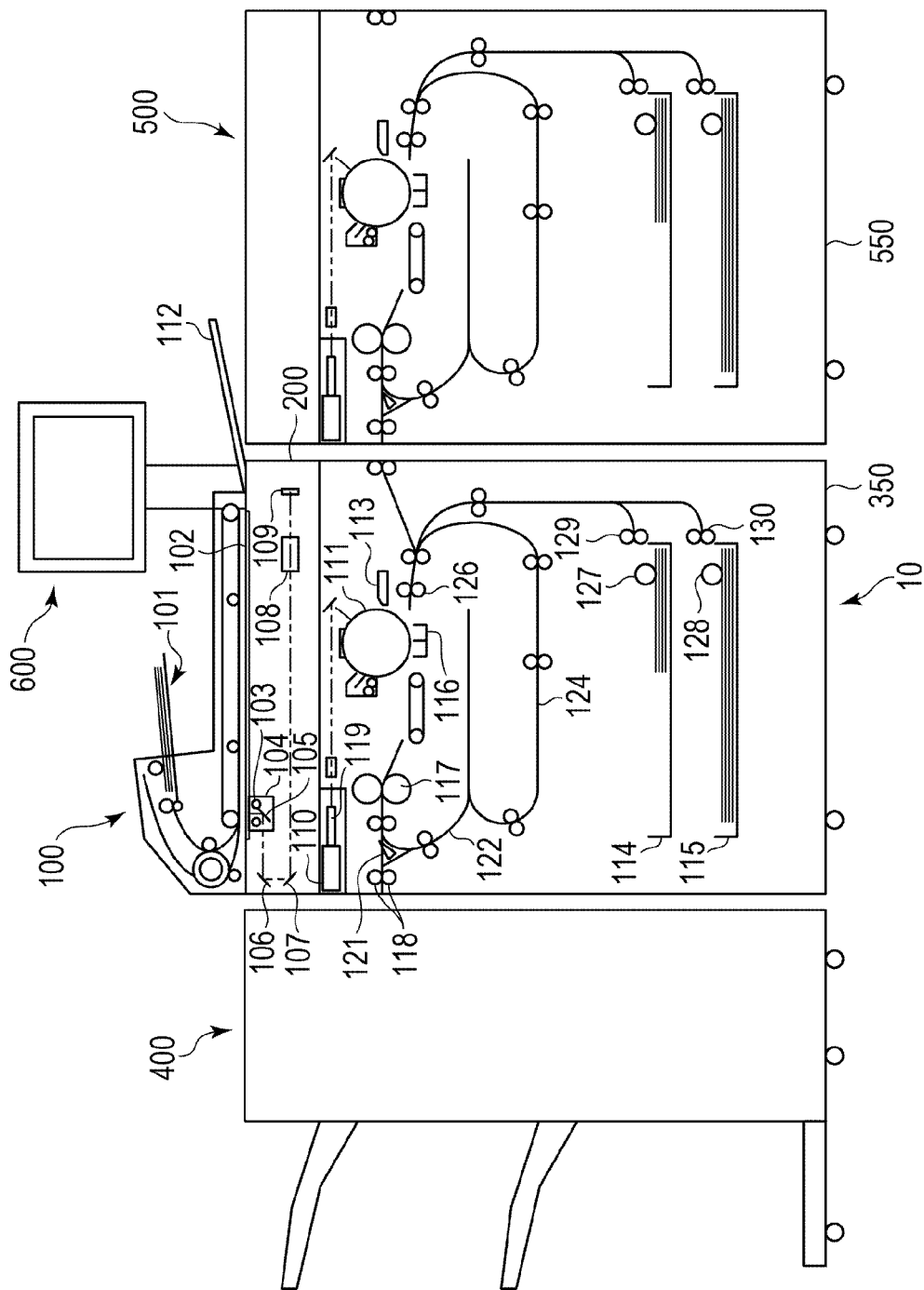
FIG. 1 is a cross-sectional view illustrating the configuration of a tandem image forming system.

FIG. 1 is a schematic cross-sectional view of an image forming system according to a first embodiment of the present invention. As illustrated in FIG. 1, the image forming system includes a first image forming apparatus 10, a second image forming apparatus 500, and a finisher 400 serving as a post-processing apparatus. The first image forming apparatus 10 includes an image reader 200 that reads an image of an original, and a printer 350 that forms a read image on a sheet. The second image forming apparatus 500 is disposed upstream of the first image forming apparatus 10, and includes a printer 550 having substantially the same configuration as the printer 350 of the first image forming apparatus 10, except that no image reader is provided.

Image Forming Unit

The image reader 200 of the first image forming apparatus 10 has an original feeder 100. The original feeder 100 sequentially feeds originals one by one which are set with the image surfaces thereof facing up on an original document tray 101, starting from the first page, conveys each original from left to right across a platen glass 102, and then discharges the originals onto an external paper output tray 112. When each original passes through a read position on the platen glass 102 from left to right, the image on the original is read by a scanner unit 104 held at the read position. The images are read using a method generally called a moving original reading method. Specifically, when passing through the read position, each original is irradiated with a lamp 103 of the scanner unit 104, and light reflected from the original is directed to a lens 108 through mirrors 105, 106, and 107. The light that has passed through the lens 108 is focused on an image pickup surface of an image sensor 109. The light focused on the image sensor 109 is converted into image data, and the image data is output. The output image data is input as a video signal to an exposure unit 110 of the printer 350 and an exposure unit of the printer 550 of the second image forming apparatus 500.

The exposure unit 110 of the printer 350 modulates laser light in accordance with the video signal input from the image reader 200, and outputs the modulated laser light. The laser light is applied to a photosensitive drum 111 while being scanned by a polygonal mirror 119. An electrostatic latent image is formed on the photosensitive drum 111 in accordance with the scanned laser light. The electrostatic latent image on the photosensitive drum 111 is visualized as a toner image by toner supplied from a developing unit 113.

A sheet fed by a pickup roller 127 or 128 from an upper cassette 114 or a lower cassette 115 in the printer 350 is conveyed to a registration roller 126 by using a paper feed roller 129 or 130. After the tip of the sheet has reached the registration roller 126, the registration roller 126 conveys the sheet between the photosensitive drum 111 and a transfer unit 116 at a predetermined timing. The toner image formed on the photosensitive drum 111 is transferred onto the fed sheet by the transfer unit 116. The sheet onto which the toner image has been transferred is conveyed to a fixing unit 117, and the fixing unit 117 fixes the toner image onto the sheet by heating and pressurizing the sheet. After having passed through the fixing unit 117, the sheet is discharged to the finisher 400 from the printer 350 through a flapper 121 and a discharge roller 118.

When the sheet is to be discharged with the image forming surface thereof facing down (or discharged face down), the printer 350 introduces the sheet into a reverse path 122 by switching the flapper 121. When the trailing edge of the sheet has passed through the flapper 121, the printer 350 switches back the sheet and discharges the sheet using the discharge roller 118. This discharging style is referred to as "reverse discharge". The reverse discharge is performed when images are formed in sequence, starting from the first page, and the discharged sheets are stacked in correct page order. In a case where the image forming apparatus 10 performs duplex printing alone, a sheet, one side of which has been printed, is conveyed to a duplex printing path 124. In this embodiment, however, the image forming apparatus 10 does not perform duplex printing alone, and the duplex printing path 124 is not therefore used.

The printer 550 of the second image forming apparatus 500 has substantially the same configuration and uses substantially the same image forming method as the printer 350 described above, and a description thereof is thus omitted herein.

Operation Display Device

Figure 2:
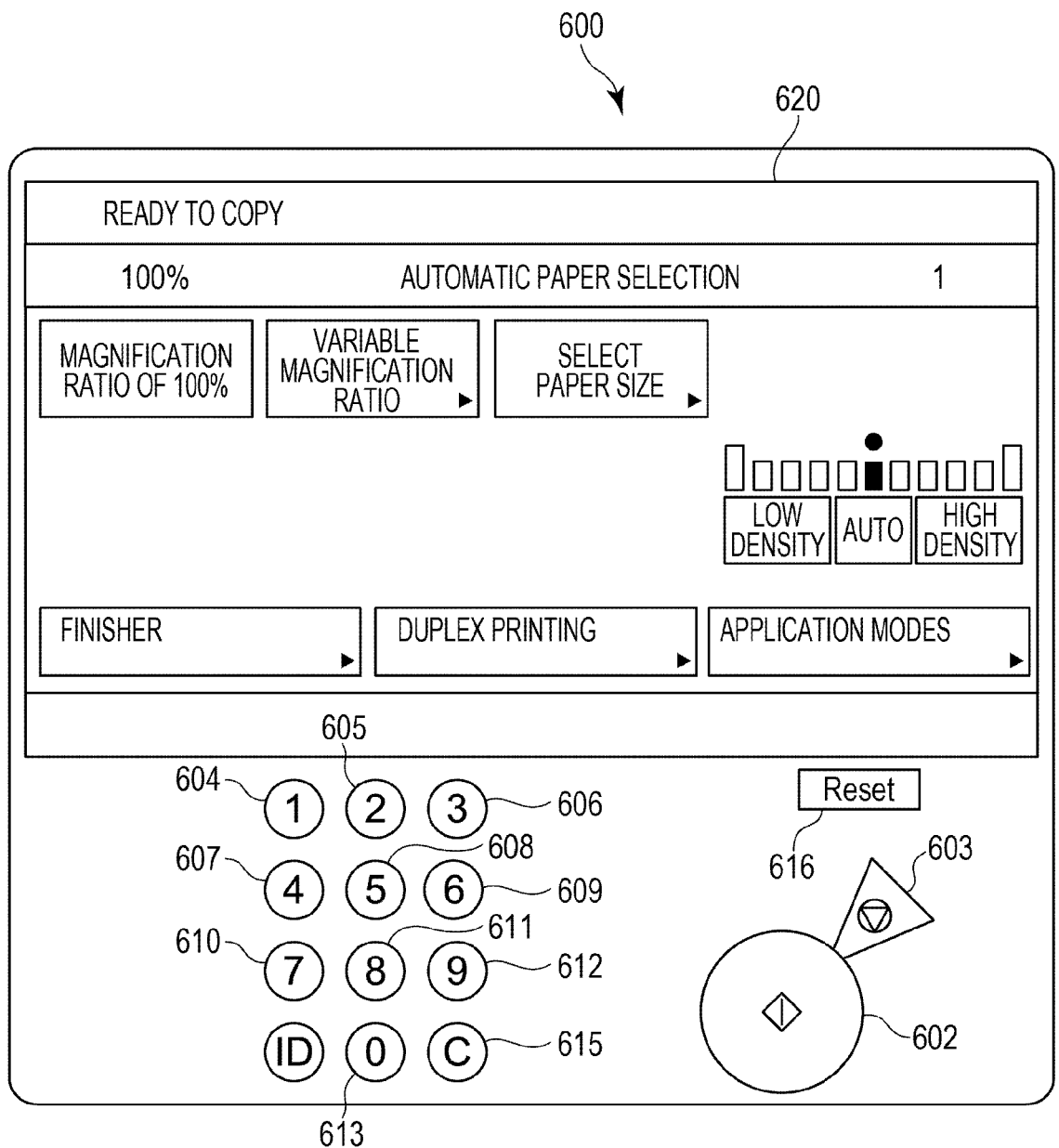
FIG. 2 is a diagram illustrating an operation display device.

FIG. 2 illustrates an operation display device 600 in the image forming apparatus 10 illustrated in FIG. 1. The operation display device 600 has a start key 602 for starting an image forming operation, a stop key 603 for stopping the image forming operation, a ten-key pad including keys 604 to 613 for numeric setting or the like, a clear key 615, a reset key 616, and any other suitable key. The operation display device 600 further has a liquid crystal display unit 620 having a touch panel formed on a surface thereof, and allows soft keys to be created on the screen.

In the above image forming system, processing modes such as a "non-sort" mode, a "sort" mode, a "staple-sort" mode (binding mode), and a "saddle stitch binding" mode may be set as post-processing modes. The above processing modes may be set in accordance with an input operation from the operation display device 600. For example, when a post-processing mode is to be set, a "finisher" key is selected in the initial screen illustrated in FIG. 2. Then, a menu selection screen is displayed on the display unit 620, and the post-processing mode is set using the menu selection screen.

Finisher

Figure 3:
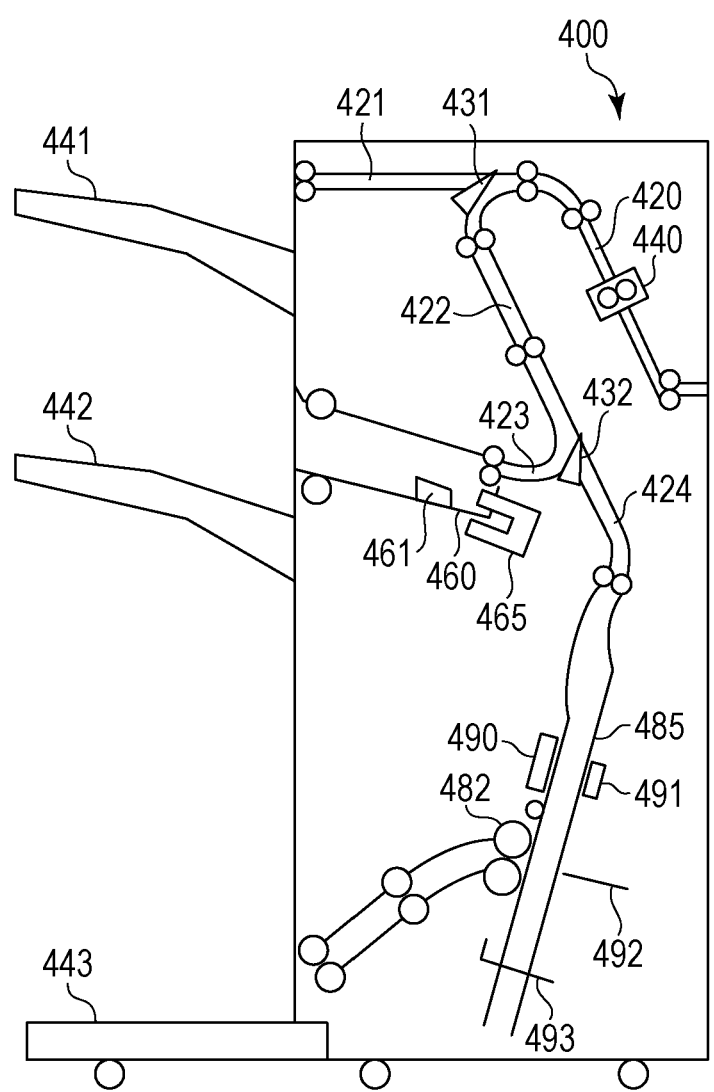
FIG. 3 is a cross-sectional view illustrating the configuration of a finisher.

FIG. 3 is a cross-sectional view illustrating an internal configuration of the finisher 400 according to the present invention.

The finisher 400 sequentially receives sheets discharged from the image forming apparatus 10, and performs various post-processing operations on each of the received sheets. Examples of the post-processing operations include an operation of collating a plurality of sheets together into sheet bundles, an operation of stapling a rear edge of each sheet bundle, a process of punching a hole in each captured sheet around the rear edges thereof, and saddle stitching binding.

A punching unit 440 is provided in an entrance path 420. The punching unit 440 is operated, if necessary, to punch a hole in a conveyed sheet around the rear edge thereof.

A switching flapper 431 is disposed downstream in the entrance path 420, and the switching flapper 431 switches the destination to which a sheet is to be conveyed between a non-sort path 421 and a sort path 422. A sheet directed to the non-sort path 421 is discharged onto a sample tray 441 through a conveying roller pair.

A switching flapper 432 is disposed downstream in the sort path 422. The switching flapper 432 switches the destination to which a sheet is to be conveyed between a sorting discharge path 423 and a binding path 424. A sheet directed to the sorting discharge path 423 is stacked on a processing tray 460 through a conveying roller pair. A bundle of sheets stacked on the processing tray 460 is subjected to collation using collating members 461 provided on the side nearer the viewer and on the side farther away from the viewer, stapling, etc., if necessary, and is discharged onto a stack tray 442 using a discharge roller pair.

A stapler 465 is configured to be movable along the outer periphery of the processing tray 460, and staples a sheet bundle stacked on the processing tray 460 at the rear edges of the sheets in the sheet conveying direction (to the left in FIG. 3).

Sheets directed to the binding path 424 are conveyed to a binding processing tray 485 through a conveying roller pair. The binding processing tray 485 includes a movable sheet positioning member 493 configured to move up and down to a predetermined position in accordance with the sheet size. The binding processing tray 485 further includes anvils 491 at positions facing two pairs of staplers 490. The staplers 490 and the anvils 491 cooperate with each other to staple a sheet bundle received in the binding processing tray 485.

A folding roller pair 482 is provided downstream of the staplers 490, and a projecting member 492 is located so as to face the folding roller pair 482. The projecting member 492 projects toward sheet bundles received in the binding processing tray 485, and pushes out a sheet bundle received in the binding processing tray 485 between the folding roller pair 482. The folding roller pair 482 folds the sheet bundle and conveys the folded sheet bundle to the downstream side. The folded sheet bundle is discharged onto a binding tray 443 via conveying roller pairs.

Overall System Block Diagram

Figure 4:
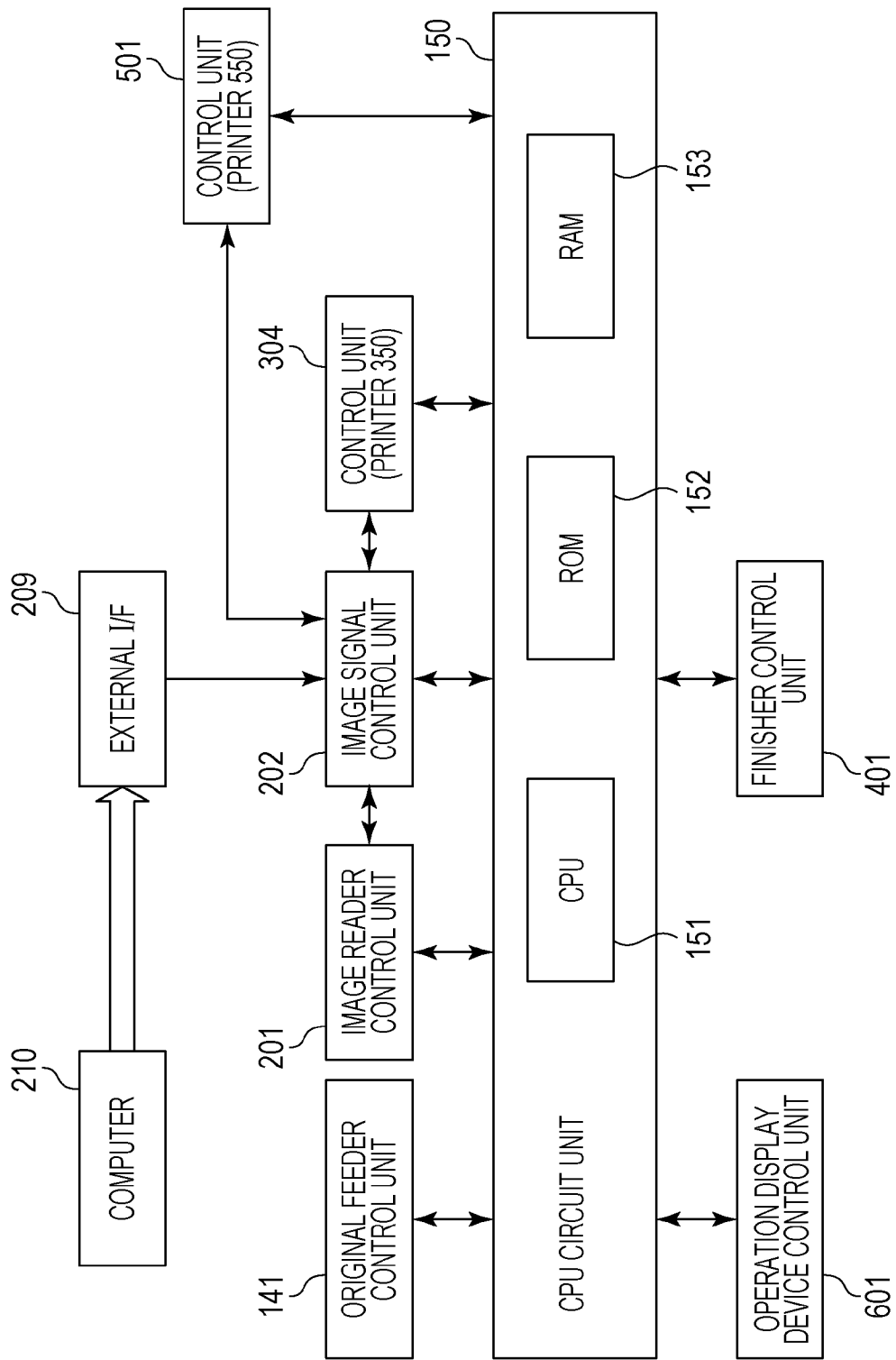
FIG. 4 is a control block diagram of the image forming system.

Next, overall control of the image forming system will be described with reference to FIG. 4. FIG. 4 is a block diagram illustrating the control configuration of the entire image forming system illustrated in FIG. 1.

A central processing unit (CPU) circuit unit 150 includes a CPU 151, a read-only memory (ROM) 152, and a random access memory (RAM) 153. The CPU 151 is configured to control the basic operation of the entire image forming system, and is connected to the ROM 152 and the RAM 153 via an address bus and a data bus. The CPU 151 collectively controls an original feeder control unit 141, an image reader control unit 201, an image signal control unit 202, a control unit 304, a control unit 501, an operation display device control unit 601, and a finisher control unit 401 in accordance with a control program stored in the ROM 152. The RAM 153 temporarily holds control data, and is also used as a work area for computational processing involved in control.

The original feeder control unit 141 controls the driving of the original feeder 100 in accordance with an instruction from the CPU circuit unit 150. The image reader control unit 201 controls the driving of the scanner unit 104, the image sensor 109, and the like described above, and transfers an analog image signal output from the image sensor 109 to the image signal control unit 202. The image signal control unit 202 converts the analog image signal output from the image sensor 109 into a digital signal, and then performs various kinds of image processing to convert the digital signal into a video signal. The image signal control unit 202 outputs the video signal to the control unit 304 of the printer 350 and the control unit 501 of the printer 550. The image signal control unit 202 further performs various kinds of image processing on a digital image signal input from a computer 210 through an external interface (I/F) 209 to convert the digital image signal into a video signal, and outputs the video signal to the control unit 304. The processing operation performed by the image signal control unit 202 is controlled by the CPU circuit unit 150. The control units 304 and 501 control the exposure unit 110 of the printer 350 and the exposure unit of the printer 550 described above, respectively, in accordance with the input video signals.

The operation display device control unit 601 allows information to be exchanged between the operation display device 600 and the CPU circuit unit 150. The operation display device 600 has a plurality of keys for setting various functions regarding image formation, and a display unit for displaying information about the setting state. The operation display device control unit 601 outputs a key signal corresponding to the operation of each key to the CPU circuit unit 150, and displays corresponding information on the operation display device 600 in accordance with a signal from the CPU circuit unit 150.

Block Diagram of Finisher

Figure 5:
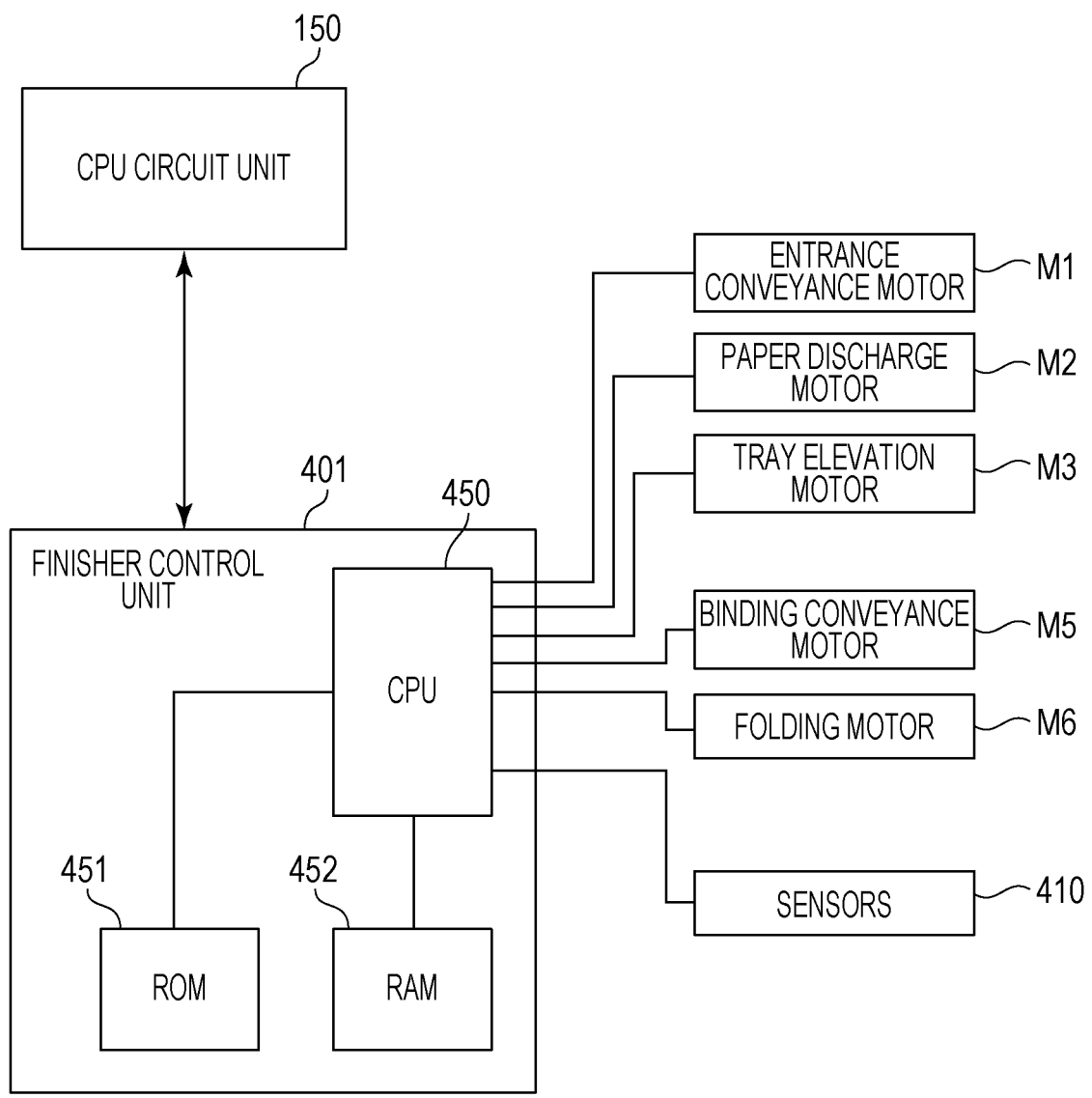
FIG. 5 is a control block diagram of the finisher.
Figure 6:
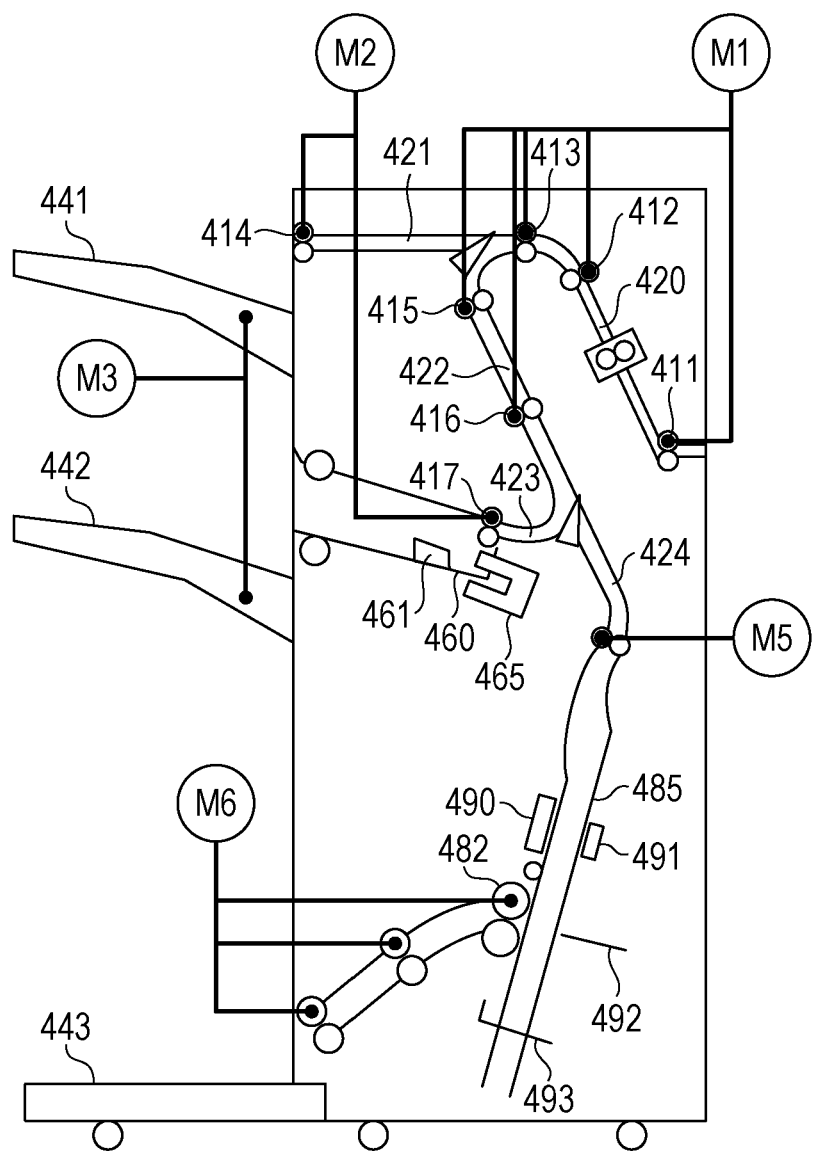
FIG. 6 is a diagram illustrating a drive system of the finisher.

Next, the configuration of the finisher control unit 401 that controls the driving of the finisher 400 will be described with reference to FIGS. 5 and 6. FIG. 5 is a block diagram illustrating the configuration of the finisher control unit 401 illustrated in FIG. 4.

The finisher control unit 401 includes a CPU 450, a ROM 451, a RAM 452, and any other suitable device. The finisher control unit 401 communicates with the CPU circuit unit 150 included in the image forming apparatus 10 through a communication integrated circuit (IC) (not illustrated) to exchange data, and executes any of programs stored in the ROM 451 in accordance with an instruction from the CPU circuit unit 150 to control the driving of the finisher 400.

The finisher control unit 401 controls an entrance conveyance motor M1, a paper discharge motor M2, a tray elevation motor M3, a binding conveyance motor M5, and a folding motor M6. The entrance conveyance motor M1 drives conveying roller pairs in the entrance path 420 and the sort path 422. The paper discharge motor M2 drives the conveying roller pairs in the non-sort path 421 and the sorting discharge path 423. The tray elevation motor M3 drives the sample tray 441 and the stack tray 442 to move up and down. The binding conveyance motor M5 drives the conveying roller pair that conveys a sheet from the binding path 424 to the binding processing tray 485. The folding motor M6 drives the folding roller pair 482 that conveys a sheet from the binding processing tray 485 that folds the sheet bundle and the other roller pairs that convey the folded sheet bundle to the binding tray 443 provided downstream of the binding processing tray 485. Sensors 410 are sensors that detect a sheet.

Discharge Control of Image Forming Apparatus

Next, discharge control of the first image forming apparatus 10 will be described. As described above, the first image forming apparatus 10 discharges a sheet through straight discharge, in which a sheet that has passed through the fixing unit 117 is conveyed to the discharge roller 118 with the image forming surface of the sheet facing up, or reverse discharge, in which a sheet that has passed through the fixing unit 117 is conveyed to the discharge roller 118 with the image forming surface of the sheet facing down.

In the straight discharge, a sheet is conveyed to the fixing unit 117 and the discharge roller 118 while keeping a speed of 500 mm/s, which is equal to the driving speed of the photosensitive drum 111, and is discharged to the finisher 400. In the reverse discharge, a sheet is conveyed at a speed of 500 mm/s until the sheet has passed through the fixing unit 117, and the sheet that has passed through the fixing unit 117 is conveyed along the reverse path 122 at an increased speed of 1300 mm/s. After having been switched back, the sheet is discharged to the finisher 400 through the discharge roller 118 at a speed of 1300 mm/s. If sheets are conveyed at a speed of 500 mm/s along the reverse path 122 even after having passed through the fixing unit 117 and having been switched back, a sheet that is being conveyed along the reverse path 122 through after switched back may collide with the following sheet that is conveyed into the reverse path 122. In order to avoid such collision of sheets, the first image forming apparatus 10 is configured such that the conveyance speed of a sheet is increased when the sheet passes through the fixing unit 117 to allow the sheet to have left the reverse path 122 before the following sheet is conveyed into the reverse path 122. The conveyance speed is controlled by the CPU circuit unit 150. That is, the CPU circuit unit 150 functions as a speed controller.

Conveyance Control of Finisher

Next, conveyance control of the finisher 400 will be described with reference to FIG. 6. FIG. 6 illustrates a drive system of the finisher 400. The entrance conveyance motor M1 drives conveying roller pairs 411, 412, 413, 415, and 416. The paper discharge motor M2 drives conveying roller pairs 414 and 417. The binding conveyance motor M5 drives a conveying roller pair. Therefore, the finisher 400 is not allowed to change the speed of the motor M1 until a sheet to be discharged to the sample tray 441 has passed through the conveying roller pair 413. Similarly, the finisher 400 is not allowed to change the speed of the motor M1 until a sheet to be discharged to the processing tray 460 or a sheet to be discharged to the binding processing tray 485 has passed through the conveying roller pair 416.

The finisher 400 drives the entrance conveyance motor M1 so that the speed at which the finisher 400 receives a sheet from the first image forming apparatus 10 is equal to the discharge speed provided by the first image forming apparatus 10. As described above, the image forming apparatus 10 provides a discharge speed of 500 mm/s in the straight discharge, and provides a discharge speed of 1300 mm/s in case of reverse discharge. When a sheet is discharged from the non-sort path 421 to the sample tray 441, sheet is conveyed along the entrance path 420 at a speed of 500 mm/s or 1300 mm/s in accordance with the discharge method of the first image forming apparatus 10. After that, the sheet is conveyed along the non-sort path 421 at a speed equal to that along the entrance path 420. When the trailing edge of the sheet has passed through the conveying roller pairs 411, 412, and 413 driven by the entrance conveyance motor M1, the paper discharge motor M2 is accelerated so that the conveyance speed is increased to 1500 mm/s. Further, the paper discharge motor M2 is decelerated so that the conveyance speed is reduced to 300 mm/s before the sheet conveyed along the non-sort path 421 is discharged to the sample tray 441 through the conveying roller pair 414 driven by the paper discharge motor M2.

When a sheet is discharged onto the sample tray 441, the paper discharge motor M2 is accelerated to a speed equal to that of the entrance conveyance motor M1 in order to wait for the following sheet to be conveyed from the entrance path 420. The reason that the paper discharge motor M2 is accelerated and decelerated is to prevent a sheet to be discharged to the sample tray 441 from being ejected from the sample tray 441 because the conveyance speed of the sheet is too high and from failing to be placed on the sample tray 441 because the conveyance speed of the sheet is too low. In this embodiment, since the speed at which sheets are discharged onto the sample tray 441 is lower than the conveyance speed obtained when the finisher 400 receives sheets, simple deceleration before sheets are discharged onto the sample tray 441 may reduce the interval between sheets and cause a paper jam because of collision of sheets. In order to avoid a paper jam, the sheet conveyance speed is increased at the time when a sheet has passed through the conveying roller pair 413 driven by the entrance conveyance motor M1, thereby increasing the interval between the sheet and the sheet which follows.

Similar processing may be performed when a sheet is conveyed from the sort path 422 to the sorting discharge path 423. Specifically, when the sheet has passed through the conveying roller pairs 411, 412, 413, 415, and 416 driven by the entrance conveyance motor M1, the conveyance speed of the conveying roller pair 417 driven by the paper discharge motor M2 is increased from 500 mm/s or 1300 mm/s to 1500 mm/s. After that, the conveyance speed of the conveying roller pair 417 is reduced to 300 mm/s before the sheet is discharged to the processing tray 460. When the sheet is discharged onto the processing tray 460, the paper discharge motor M2 is accelerated to a speed equal to that of the entrance conveyance motor M1 for the following sheet that is conveyed into the sorting discharge path 423 from the sort path 422.

The entrance conveyance motor M1 is driven so that the conveyance speed thereof at the entrance of the finisher 400 becomes equal to the discharge speed provided by the first image forming apparatus 10. When the discharge speed provided by the first image forming apparatus 10 is changed, the driving speed of the entrance conveyance motor M1 is changed in accordance with the change in the discharge speed.

If only the speed of the entrance conveyance motor M1 is changed when a sheet is being conveyed over both the conveying roller pair 413 driven by the entrance conveyance motor M1 and the conveying roller pair 414 driven by the paper discharge motor M2, the sheet may be stretched or compressed. A similar problem may occur when a sheet is being conveyed over both the conveying roller pair 416 driven by the entrance conveyance motor M1 and the conveying roller pair 417 driven by the paper discharge motor M2. In order to avoid this problem, the speed of the entrance conveyance motor M1 is changed by performing control to discharge a sheet from the first image forming apparatus 10 to the finisher 400 after the preceding sheet has left the entrance path 420 and the non-sort path 421 or the sort path 422. When the speed of the entrance conveyance motor M1 is changed, that is, each time the discharge method of the first image forming apparatus 10 is changed, sheet interval is increased, resulting in low productivity.

Printing Operation

Next, a printing operation performed in cooperation with the first image forming apparatus 10 and the second image forming apparatus 500 will be described with reference to FIG. 7. First, a description will be given of an operation for executing a simplex print job for performing simplex printing (simplex image forming mode). Upon receipt of an image of an original read by the image reader 200 or upon receipt of an image signal input from an external computer via the external I/F 209, the image signal control unit 202 outputs the image signal to the control unit 304. In this case, the image signal is not output to the control unit 501. After forming an image on one side (front side) of a sheet, the first image forming apparatus 10 reverses the sheet through the reverse path 122, and discharges the sheet face down. This operation is referred to as a "pattern PT1".

The following method for processing a print job for simplex printing is also available. The image signal control unit 202 outputs the image signal to the control unit 501. The second image forming apparatus forms an image on one side of a sheet, reverses the sheet, and discharges the sheet face down to the first image forming apparatus 10. After that, the first image forming apparatus 10 discharges the sheet without forming an image or reversing the sheet. The above method also allows the finisher 400 to stack sheets face down in correct page order. In this method, however, because sheets travel through the first image forming apparatus 10, a long time is required for the first sheet to be discharged to the finisher 400. Additionally, a conveying member may be worn. In order to avoid unwanted difficulties such as wear, as described above, only the first image forming apparatus 10 performs a printing operation in a simplex printing mode.

A description will now be given of an operation for executing a duplex print job for performing duplex printing (duplex image forming mode). The image signal control unit 202 outputs an image signal to the control unit 304 and the control unit 501 on a page-by-page basis. The second image forming apparatus 500 feeds a sheet, and forms an image on the front side (odd number page) of the sheet. Then, the second image forming apparatus 500 reverses the sheet, and discharges the sheet face down to the first image forming apparatus 10.

Upon receipt of the sheet, the first image forming apparatus 10 forms an image on the back side (even number page) of the sheet, and then discharges the sheet to the finisher 400 through the discharge roller 118 without reversing the sheet. In this case, the sheet is delivered to the finisher 400 with the front side (odd number page) facing down. This operation is referred to as a "pattern PT2". In the duplex printing operation, therefore, sheets are not fed from the upper cassette 114 or the lower cassette 115 of the first image forming apparatus 10 but are fed only from the upper cassette or the lower cassette of the second image forming apparatus 500.

The following method for processing a print job for duplex printing is also available. The second image forming apparatus 500 forms an image on the back side (even number page) of a sheet, and reverses the sheet. After that, the first image forming apparatus 10 forms an image on the front side (odd number page). In this method, however, because sheets are not stacked in correct page order unless the front sides of the sheets are placed face down when the sheets are discharged to the finisher 400, the first image forming apparatus 10 needs to reverse the sheets after having formed images on the front sides of the sheets. Thus, since an extra operation of causing the sheets to travel along the reverse path 122 is performed, a conveying member may be worn. In the duplex printing operation, therefore, as described above, the first image forming apparatus 10 performs a printing operation for the back side of a sheet, and the second image forming apparatus 500 performs a printing operation for the front side of the sheet.

A description will now be given of an operation for executing a print job for both simplex printing and duplex printing (hereinafter referred to as a "combined simplex-duplex print job". In an operation in which printing is performed both in a simplex printing mode and a duplex printing mode, the image signal control unit 202 outputs an image signal on a page-by-page basis to the control unit 304 in the simplex printing mode and to the control unit 304 and the control unit 501 in the duplex printing mode. In simplex printing of a combined simplex-duplex print job, similarly to the operation described above, the first image forming apparatus 10 feeds a sheet, forms an image on one side (front side) of the sheet. After that, the first image forming apparatus 10 reverses the sheet, and discharges the sheet face down to the finisher 400. This operation is referred to as a "pattern PT3", which is substantially the same as the pattern PT1.

In duplex printing of a combined simplex-duplex print job, the second image forming apparatus 500 feeds a sheet, and forms an image on one side (back side) of the sheet. After that, the second image forming apparatus 500 reverses the sheet, and discharges the sheet face down to the first image forming apparatus 10. Upon receipt of the sheet, the first image forming apparatus 10 forms an image on the other side (front side) of the sheet. After that, the first image forming apparatus 10 reverses the sheet, and discharges the sheet to the finisher 400. In this case, the sheet is delivered to the finisher 400 with the front side thereof facing down. This operation is referred to as a "pattern PT4".

In this way, when a duplex print job for performing duplex printing, the second image forming apparatus 500 forms an image on the front side (odd number page) of a sheet, and the first image forming apparatus 10 forms an image on the back side (even number page) of the sheet. In this case, the first image forming apparatus 10 discharges the sheet in a straight manner. In duplex printing of a combined simplex-duplex print job, in contrast, the second image forming apparatus 500 forms an image on the back side (even number page) of a sheet, and the first image forming apparatus 10 forms an image on the font side (odd number page) of the sheet. In this case, the first image forming apparatus 10 discharges a sheet in a reversed state. Also in simplex printing of a combined simplex-duplex print job, the first image forming apparatus 10 discharges a sheet in a reversed state. Even when the first image forming apparatus 10 discharges a sheet in a reversed state, acceleration control can maintain a discharge interval equivalent to that in the straight discharge, and the time required for discharging the sheet is not increased.

Accordingly, in a combined simplex-duplex print job, the first image forming apparatus 10 always discharges sheets in a reversed state. Therefore, the finisher 400 can always receive the sheets at the same conveyance speed, and does not need to change the conveyance speed, resulting in no need to increase the intervals at which sheets are conveyed. Consequently, a reduction in productivity can be prevented. In addition, the number of times the speed of the motor M1 is changed can be reduced, leading to a prolonged lifetime of the motor M1.

Control for Allocation of Images to be Formed

Figure 8:
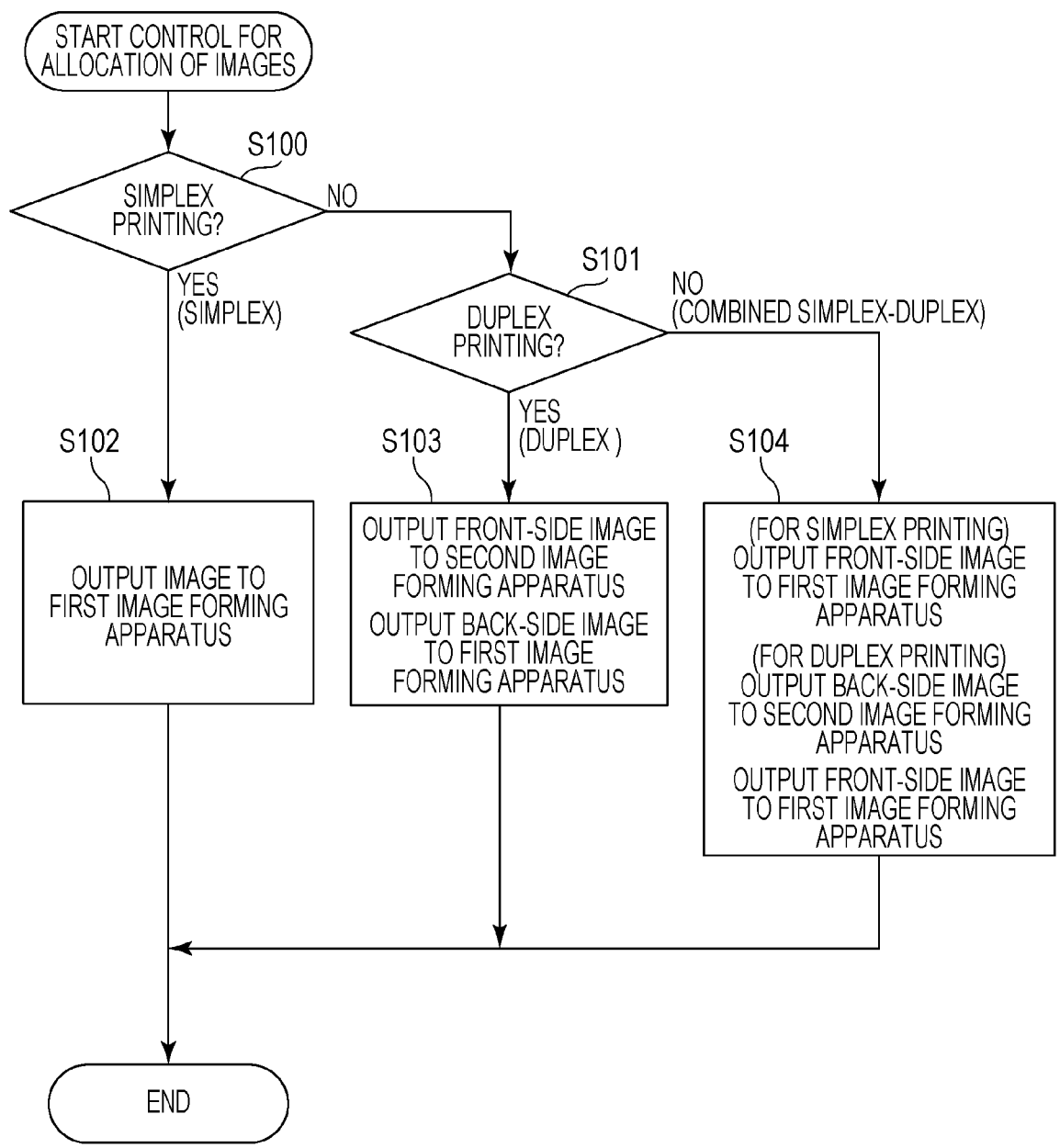
FIG. 8 is a flowchart illustrating control for allocation of images.

Next, control for allocation of images will be described with reference to FIG. 8. FIG. 8 is a flowchart illustrating page-by-page control for allocation of images, which is performed by the image signal control unit 202. The term "allocation of images" is used to refer to determination of which image forming apparatus forms an image on which page.

As described above, the image signal control unit 202 receives information about a simplex print job, a duplex print job, or a combined simplex-duplex print job from the CPU circuit unit 150, and selectively switches between the control units 304 and 501 to output an input image signal. First, the image signal control unit 202 determines whether or not a job to be output is a simplex print job (S100). If the job is a simplex print job, the image signal control unit 202 determines that the image signal is output to only the control unit 304 (S102). If it is determined in S100 that the job is not a simplex print job, the image signal control unit 202 determines whether or not the job is a duplex print job (S101). If the job is a duplex print job, the image signal control unit 202 determines that the image signal for the front side is output to the control unit 501 and that the image signal for the back side is output to the control unit 304 (S103). If it is determined in S101 that the job is not a duplex print job, the image signal control unit 202 determines that the job is a combined simplex-duplex print job, and determines that, for simplex printing, the image signal is output to the control unit 304. The image signal control unit 202 further determines that, for duplex printing, the image signal for the back side is output to the control unit 501 and the image signal for the front side is output to the control unit 304 (S104). Therefore, the image signal control unit 202 and the CPU circuit unit 150 function as an image forming controller or a printer controller.

In a configuration in which a post-processing apparatus that switches the conveyance speed in accordance with the sheet discharge speed of an image forming apparatus is not connected to the image forming apparatus, the image signal control unit 202 performs control so that allocation of images to be formed for duplex printing of a combined simplex-duplex print job may be performed in a manner similar to that for a duplex print job.

Determination of Operation Pattern

Figure 9:
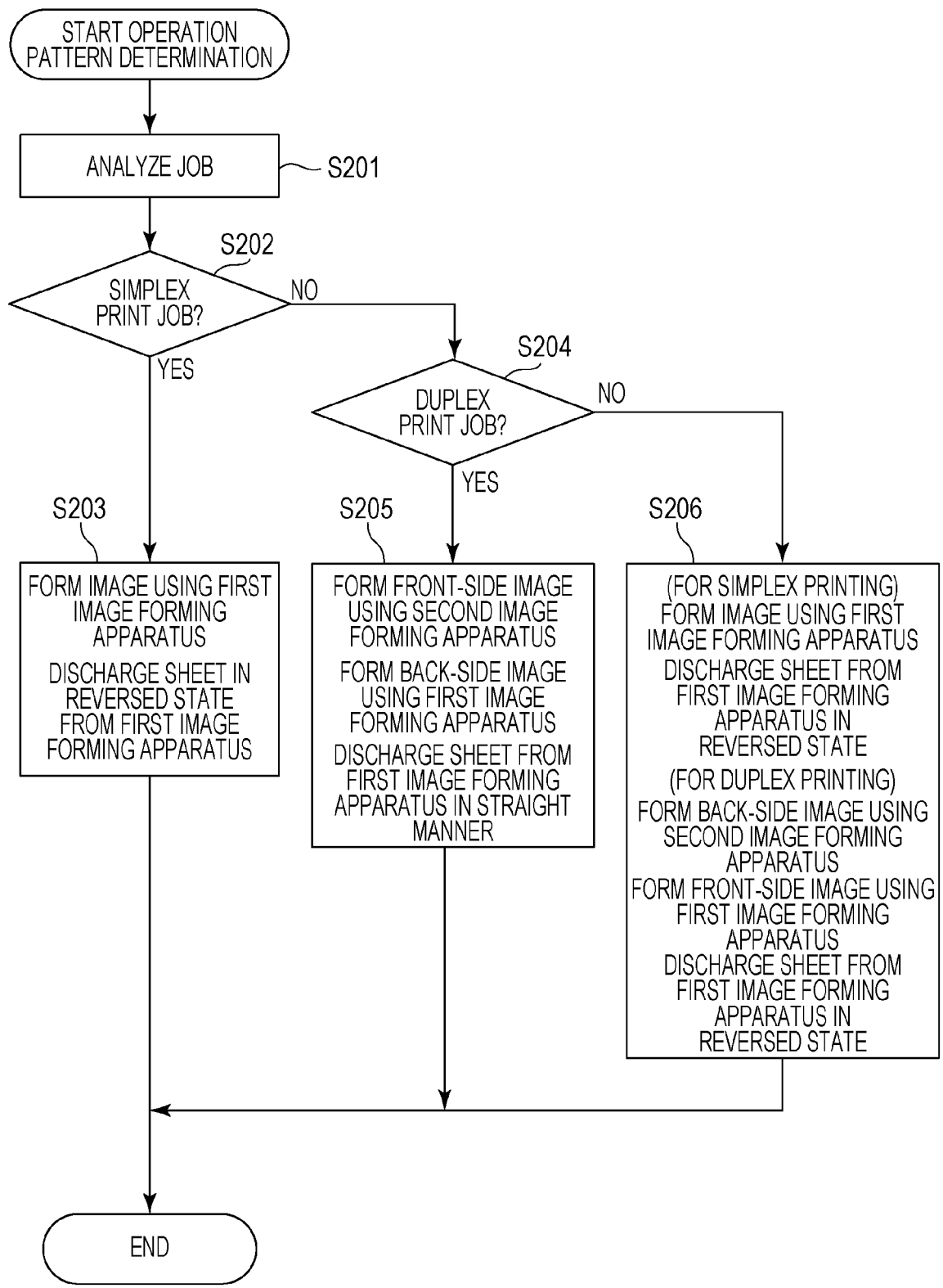
FIG. 9 is a flowchart illustrating control for determination of an operation pattern.

Next, a process for determining the operation pattern of the first and second image forming apparatuses, which is performed using the CPU circuit unit 150, will be described. FIG. 9 is a flowchart illustrating a process for determining an operation pattern, which is executed by the CPU 151. First, the CPU 151 analyzes an input print job (S201), and determines whether the print job is a simplex print job, a duplex print job, or a combined simplex-duplex print job (S202, S204). If the print job is a simplex print job, the CPU 151 notifies the image signal control unit 202 that the print job is a simplex print job, and also instructs the control unit 304 to cause the first image forming apparatus 10 to execute the print job and to cause the first image forming apparatus 10 to discharge a sheet in a reversed state (S203). If the print job is a duplex print job, the CPU 151 notifies the image signal control unit 202 that the print job is a duplex print job. The CPU 151 further instructs the control unit 501 to cause the second image forming apparatus 500 to form an image on the front side of a sheet, and instructs the control unit 304 to cause the first image forming apparatus 10 to form an image on the back side of the sheet and to cause the first image forming apparatus 10 to discharge the sheet in a straight manner (S205). If the print job is not a simplex print job or a duplex print job, the print job is a combined simplex-duplex print job. In this case, for simplex printing, the CPU 151 instructs the control unit 304 to cause the first image forming apparatus 10 to form an image on a sheet and to discharge the sheet in a reverse state. For duplex printing, the CPU 151 instructs the control unit 501 to cause the second image forming apparatus 500 to form an image on the back side of a sheet, and instructs the control unit 304 to cause the first image forming apparatus 10 to form an image on the front side of the sheet and to cause the first image forming apparatus 10 to discharge the sheet in a reversed state (S206).

FIG. 10 illustrates the correspondence between print jobs and print results obtained by the first and second image forming apparatuses 10 and 500. In FIG. 10, a combined simplex-duplex print job for performing simplex printing on the first to third and fifth sheets and performing duplex printing on the fourth sheet is illustrated. The first image forming apparatus 10 forms an image on the front side of each of the first to third sheets to be subjected to simplex printing. The second image forming apparatus 500 forms an image on the back side of the fourth sheet to be subjected to duplex printing, and reverses the sheet. After that, the sheet is delivered to the first image forming apparatus 10, and the first image forming apparatus 10 forms an image on the other side, or the front side, of the sheet. The first image forming apparatus 10 forms an image on the front side of the fifth sheet to be subjected to simplex printing in a manner similar to that on the first sheet. The first image forming apparatus 10 forms an image on the front side of each of the first to fifth sheets, and the first to fifth sheets are reversed and are conveyed so that the respective sheets are delivered face down to the finisher 400.

In the foregoing embodiment, the first image forming apparatus 10 is used for simplex printing. However, the image forming apparatus to be used may be switched every predetermined number of sheets to allow the first image forming apparatus 10 and the second image forming apparatus 500 to be uniformly used. This can prevent only one image forming apparatus from being degraded.

In the foregoing embodiment, an example has been described in which sheets are output, starting from the image data of the first page, and are stacked face down onto the finisher 400. However, depending on the configuration of an image forming system, sheets may be output, starting from the image data of the last page, and may be stacked face up onto a post-processing apparatus with the image forming surface on the front side thereof facing up. Also in this case, when printing is to be performed in both the simplex printing mode and the duplex printing mode, the front side and the back side of a sheet to be subjected to duplex printing are processed by two separate printers so that the discharge speed of the post-processing apparatus is not switched between the simplex printing mode and the duplex printing mode. That is, for simplex printing in a combined simplex-duplex print job, the downstream image forming apparatus, i.e., the first image forming apparatus 10, forms an image on a sheet, and discharges the sheet face up in a straight manner. For duplex printing, the second image forming apparatus 500 forms an image on the back side (even number page) of a sheet, and the first image forming apparatus 10 forms an image on the front side of the sheet and discharges the sheet in a straight manner. In this manner, the formation of images on the front side and the back side of a sheet to be subjected to duplex printing is performed by two separate printers so that the discharge method in the duplex printing mode can be applied in accordance with the discharge method in the simplex printing mode.

According to this embodiment, therefore, allocation of images to be formed on the front side and the back side of a sheet to be subjected to duplex printing in a combined simplex-duplex print job is made different from that for a duplex print job, and the same discharge method as that in the simplex printing mode is performed, thus preventing a reduction in productivity. In an image forming system including no post-processing apparatuses, allocation of images to be subjected to duplex printing in a combined simplex-duplex print job may be performed in a manner similar that for a duplex print job.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-027538 filed Feb. 10, 2011, which is hereby incorporated by reference herein in its entirety.

What is claimed is:

1. An image forming system including a first image forming apparatus, a second image forming apparatus disposed upstream of the first image forming apparatus in a sheet conveying direction and connected to the first image forming apparatus, and a post-processing apparatus that receives a sheet at a speed which is changed in accordance with a conveyance speed of a sheet discharged from the first image forming apparatus and that performs post-processing on the sheet, the image forming system comprising:

an image forming controller configured to control the first image forming apparatus and the second image forming apparatus to perform a simplex image forming mode and a duplex image forming mode, the simplex image forming mode being a mode in which an image is formed on one side of a sheet and in which the sheet is discharged to the post-processing apparatus, the duplex image forming mode being a mode in which images are formed on both sides of a sheet and in which the sheet is discharged to the post-processing apparatus;

a reversing unit configured to reverse a sheet so that the sheet is discharged to the post-processing apparatus in such a manner that a first side of the sheet on which an image is formed faces down; and a speed controller configured to control a sheet conveyance speed so that a sheet which is reversed by the reversing unit is discharged to the post-processing apparatus at a first speed and a sheet which is not reversed by the reversing unit is discharged to the post-processing apparatus at a second speed slower than the first speed, wherein when a print job that includes both the simplex image forming mode and the duplex image forming mode is to be executed, in the simplex image forming mode, the image forming controller causes the reversing unit to reverse a sheet and discharge the reversed sheet at the first speed to the post-processing apparatus, and, in the duplex image forming mode, the image forming controller causes the second image forming apparatus to form an image on a second side of a sheet, causes the first image forming apparatus to form an image on the first side of the sheet, and causes the reversing unit to reverse the sheet and discharge the reversed sheet at the first speed to the post-processing apparatus; and wherein when a print job that does not include the simplex image forming mode but includes the duplex image forming mode is to be executed, the image forming controller causes the second image forming apparatus to form an image on the first side of a sheet, causes the first image forming apparatus to form an image on the second side of the sheet, and causes the reversing unit to discharge the sheet at the second speed to the post-processing apparatus without reversing the sheet.

2. The image forming system according to claim 1, wherein when a print job that includes both the simplex image forming mode and the duplex image forming mode is to be executed, in the simplex image forming mode, the image forming controller causes the first image forming apparatus to form an image.

3. A printer controller for controlling an image forming system, the image forming system including a first image forming apparatus,
a second image forming apparatus disposed upstream of the first image forming apparatus in a sheet conveying direction and connected to the first image forming apparatus,
a post-processing apparatus that receives a sheet at a speed which is changed in accordance with a conveyance speed of a sheet discharged from the first image forming apparatus,
a reversing unit that reverses a sheet so that the sheet is discharged to the post-processing apparatus in such a manner that a first side of the sheet on which an image is formed faces down, and
a speed controller that controls a sheet conveyance speed so that a sheet which is reversed by the reversing unit is discharged to the post-processing apparatus at a first speed and a sheet which is not reversed by the reversing unit is discharged to the post-processing apparatus at a second speed slower than the first speed, the printer controller comprising:

an image forming controller configured to control the first image forming apparatus and the second image forming apparatus to perform a simplex image forming mode and a duplex image forming mode, the simplex image forming mode being a mode in which an image is formed on one side of a sheet and in which the sheet is discharged to the post-processing apparatus, the duplex image forming mode being a mode in which images are formed on both sides of a sheet and in which the sheet is discharged to the post-processing apparatus, wherein when a print job that includes both the simplex image forming mode and the duplex image forming mode is to be executed, in the simplex image forming mode, the image forming controller causes the reversing unit at the first speed to reverse a sheet and discharge the reversed sheet to the post-processing apparatus, and, in the duplex image forming mode, the image forming controller causes the second image forming apparatus to form an image on a second of a sheet, causes the first image forming apparatus to form an image on the first side of the sheet, and causes the reversing unit to reverse the sheet and discharge the reversed sheet at the first speed to the post-processing apparatus, and wherein when a print job that does not include the simplex image forming mode but includes the duplex image forming mode is to be executed, the image forming controller causes the second image forming apparatus to form an image on the first side of a sheet, causes the first image forming apparatus to form an image on the second side of the sheet, and causes the reversing unit to discharge the sheet at the second speed to the post-processing apparatus without reversing the sheet.

4. The printer controller according to claim 3, wherein when a print job that includes both the simplex image forming mode and the duplex image forming mode is to be executed, in the simplex image forming mode, the image forming controller causes the first image forming apparatus to form an image.

* * * * *